United States Patent Office 3,644,351
Patented Feb. 22, 1972

3,644,351
2-ALKYL-7-SUBSTITUTED-4H-PYRIMIDO[5',4':4,5]
THIENO[3,2-d][1,3]OXAZIN-4-ONES
Arthur A. Santilli, Havertown, and Dong H. Kim, Wayne,
Pa., assignors to American Home Products Corporation, New York, N.Y.
No Drawing. Filed Nov. 4, 1969, Ser. No. 874,050
Int. Cl. C07d 87/20
U.S. Cl. 260—244 R                 5 Claims

ABSTRACT OF THE DISCLOSURE

This invention concerns 2 - alkyl - 7 - substituted-4H-pyrimido[5',4':4,5]thieno[3,2-d][1,3]oxazin - 4 - ones which are useful intermediates in the preparation of 2-alkyl - 3,7 - disubstituted thieno[2,3-d:4,5-d']dipyrimidin-4(3H) - ones which are pharmacologically active as central nervous system depressants. Further this invention is also concerned with a process for preparation of these intermediate compounds by the reaction of a 5 - amino-2-substituted thieno[2,3-d]pyrimidine-6-carboxanilide with a carboxylic acid anhydride.

This invention relates to new and novel tricyclic pyrimidothienooxazinones. In particular, it concerns 2-alkyl - 7 - substituted - 4H - pyrimido[5',4':4,5]thieno-[3,2-d][1,3]oxazin - 4 - ones which are useful intermediates in the preparation of their corresponding 2-alkyl-3,7-disubstituted thieno[2,3-d:4,5-d']dipyrimidin-4(3H)-ones which in standard and accepted biological tests have demonstrated usefulness as central nervous system depressants. Further, this invention concerns the process of preparing these new and novel intermediates by the reaction of a 5-amino-2-substituted thieno[2,3-d]pyrimidine-6-carboxanilide with a carboxylic acid anhydride.

The new and novel intermediate compounds within the scope of the present invention are exemplified by the following formula:

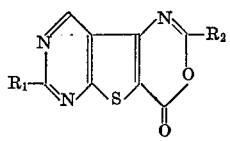

wherein R₁ is selected from the group consisting of lower alkyl, morpholino, phenyl, halophenyl, lower alkylphenyl, and lower alkoxyphenyl; and R₂ is lower alkyl. As employed herein, the terms "lower alkyl," "lower alkoxy" and the like are meant to include both branched and straight chain moieties containing from one to about six carbon atoms. Typical examples of the compounds of this invention are: 2 - methyl - 7 - phenyl - 4H - pyrimido-[5',4':4,5]thieno[3,2-d][1,3]oxazin - 4 - one; 2 - methyl-7 -(p - tolyl) - 4H - pyrimido[5',4':4,5]thieno[3,2-d][1,3] oxazin - 4 - one; and 7 - (p-chlorophenyl)-2-mehyl-4H-pyrimido[5',4':4,5]thieno[3,2-d][1,3]oxazin-4-one.

The 2 - alkyl - 7 - substituted - 4H-pyrimido[5',4':4,5] thieno[3,2-d][1,3]oxazin - 4 - ones of this invention are prepared by the new and novel process which is hereinafter schematically exemplified:

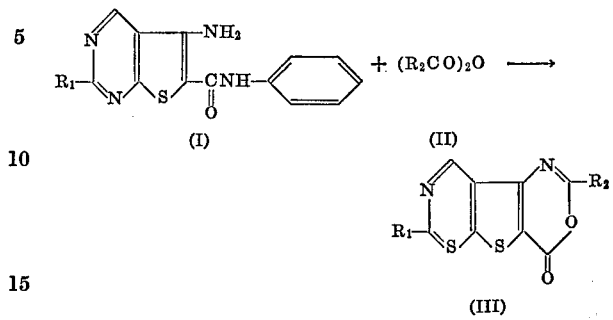

wherein R₁ and R₂ are defined as above. The reaction is effected by contacting an appropriate 5 - amino - 2 - substituted thieno[2,3-d]pyrimidine - 6 - carboxanilide (I) with a carboxylic acid anhydride (II) at about the reflux temperature of the reaction mixture for a period of about one to about five hours.

When the reaction is complete, the remaining 2-alkyl-7 - substituted - 4H - pyrimido[5',4':4,5]thieno[3,2 - d]-[1,3]oxazin - 4 - one is recovered by standard recovery procedures. For example, the reaction mixture is cooled, filtered and the separated solid recrystallized from a suitable solvent e.g. dimethylformamide.

The 5-amino-2-substituted thieno[2,3-d]pyrimidine-6-carboxanilide (I) starting compounds employed in the process of this invention are described and claimed in copending U.S. patent application, Ser. No. 874,032, entitled "5-Amino-2-Substituted Thieno[2,3-d]Pyrimidine-6-Carboxylic Acid Derivatives" by Arthur A. Santilli and Dong H. Kim, filed in the U.S. Patent Office on the same day as the subject application. Therein, these starting compounds (I) are prepared by the reaction of a 4-chloro-2-substituted-5-pyrimidine carbonitrile with 2-mercaptoacetanilide in the presence of a base (such as an alkali metal carbonate or bicarbonate such as sodium, potassium or lithium) with heating under reflux for a time period (ranging from two hours up to ten hours) in an appropriate solvent (such as a reaction inert organic solvent selected from the group of lower alkanols such as ethanol), to give the corresponding 5-amino-2-substituted thieno [2,3-d]pyrimidine-6-carboxylic acid derivatives as follows:

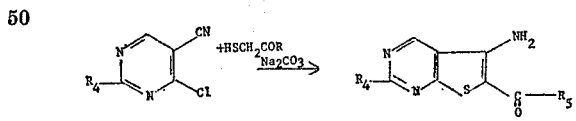

Wherein R₄ is selected from the group consisting of lower alkyl, lower alkylthio, lower alkylamino, di(lower alkylamino, phenyl, p-halophenyl, lower alkylphenyl, lower alkoxyphenyl, phen(lower)alkylamino, halophenyl (lower)alkylamino, lower alkoxy(lower)alkylamino, N-(lower)alkylpiperazino, morpholino and morpholino (lower)alkylamino; R₅ is selected from the group consisting of lower alkoxy, anilino and naphthylamino. When the reaction is complete, the resulting product is separated by routine procedures, for example, the reaction mixture is evaporated to dryness and the product crystallized from a suitable solvent, e.g. an alkanol. A reaction inert organic solvent as employed herein refers to an organic solvent which does not enter into the reaction.

The 4-chloro-2-substituted-5-pyrimidine carbonitrile are produced by reacting an appropriate 4-hydroxy-2-substituted-5-pyrimidine-carbonitrile with phosphoryl chloride to produce corresponding 4-chloro derivatives, as follows:

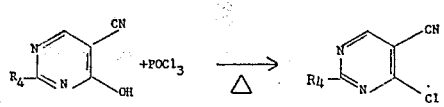

wherein $R_4$ is as set forth above. The 4-chloro-2-substituted-5-pyrimidinecarbonitrile intermediates may also be prepared by methods based on those set forth by P. Schmidt et al., Helv. Chim. Acta, 42, 763 (1959). The carboxylic acid anhydrides (II) employed in the above reaction are commercially available and are also readily prepared by well-known chemical procedures.

The new and novel 2-alkyl-7-substituted-4H-pyrimido-[5′,4′:4,5]thieno[3,2-d][1,3]oxazin-4-ones (I) of the present invention are useful intermediates in the preparation of 2-alkyl-3,7-disubstituted thieno[2,3-d:4,5-d′]dipyridin-4(3H)-ones which are described and claimed in copending U.S. patent application, Ser. No. 874,034, entitled "Thieno[2,3-d:4,5-d′]Dipyrimidin-4-(3H)-Ones" by Arthur A. Santilli and Dong H. Kim, filed in the U.S. Patent Office on the same day as the subject application.

The 2-alkyl-3,7-disubstituted thieno[2,3-d:4,5-d′]dipyrimidine-4(3H)-ones are prepared by the process which is exemplified by the following reaction scheme:

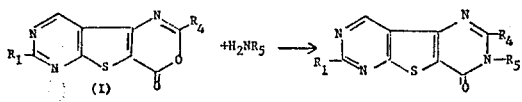

wherein $R_1$ is defined as above; $R_4$ is lower alkyl; and $R_5$ is lower alkyl, lower alkoxy(lower)alkyl, morpholino-(lower)alkyl and di(lower)alkylamino(lower)alkyl. The reaction is effected by contacting a 2-alkyl-7-substituted-4H-pyrimido[5′,4′:4,5]thieno[3,2-d][1,3]oxazin-4-one (I) with an appropriate amine (II) at about the reflux temperature of the reaction mixture for a period of about five to thirty minutes.

When the reaction is complete, the resulting 2-alkyl-3,7-disubstituted thieno[2,3-d:4,5-d′]dipyrimidin-4(3H)-one (III) is recovered by standard procedures. For example, the reaction mixture is cooled, filtered and the collected solid recrystallized from a suitable solvent, e.g. dimethylformamide. The 2-alkyl-3,7-disubstituted thieno-[2,3-d:4,5-d′]dipyrimidin-4(3H)-ones which are prepared from the intermediates of the present invention when tested in standard pharmacological procedures demonstrate central nervous system depressant activity and are particularly useful in producing a calming effect in animals. The in vivo central nervous system depressant activity of these compounds is tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate Method" (Nathan B. Eddy and Dorothy Leimbach, J. Pharmacol. Exper. Therap. 107, 385 (1953)) is used to test for analgesia. The experiment is terminated by subjecting each animal to a maximal electroshock to test for anti-convulsant activity.

These 2-alkyl-3,7-disubstituted thieno[2,3-d:4,5-d′]dipyrimidin-4(3H)-ones in the above test procedure induce decreased motor activity at a dose range of 12.7 mg./kg. to 40 mg./kg. There were no deaths in the test animals at the highest dose used, 400 mg./kg., intraperitoneally.

When these 2-alkyl-3,7-disubstituted thieno[2,3-d:4,5-d′]dipyrimidin-4(3H)-ones are employed as central nervous system depressants they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of these present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, these central nervous system depressants are most desirably administered at a concentration level that will generally afford effective results without causing any harmful or deleterious side effects.

The following examples are given by way of illustration.

EXAMPLE I 5-amino-2-phenylthieno[2,3-d]pyrimidine-6-carboxanilide (2.1 g.) in 50 ml. of acetic anhydride is heated under reflux for three hours. Thereafter, the reaction mixture is cooled in ice, filtered and the crystalline solid recrystallized from dimethylformamide to yield 2-methyl-7-phenyl-4H-pyrimido[5′,4′:4,5]thieno[3,2-d][1,3]oxazin-4-one (1.1 g.), M.P. 264–267° C.

Analysis.—Calc'd for $C_{15}H_9N_3O_2S$ (percent): C, 61.01; H, 3.07; N, 14.23; S, 10.86. Found (percent): C, 60.87; H, 3.24; N, 14.28; S, 11.20.

In a similar manner, 5-amino-2-(p-tolyl)thieno[2,3-d]pyrimidine-6-carboxanilide is reacted with acetic anhydride to yield 2-methyl-7-(p-tolyl)-4H-pyrimido[5′,4′:4,5]thieno[3,2-d][1,3]oxazin-4-one.

EXAMPLE II 5-amino-2-(p-chlorophenyl)thieno[2,3-d]pyrimidine-6-carboxanilide (4.0 g.) in 100 ml. of acetic anhydride is heated under reflux for one hour. Thereafter, the reaction mixture is cooled in ice, filtered and the collected solid recrystallized from formamide to yield 7-(p-chlorophenyl)-2-methyl-4H-pyrimido[5′,4′:4,5]thieno[3,2-d][1,3]oxazin-4-one.

In like manner, the following compounds are prepared:

7-(m-bromophenyl)-2-methyl-4H-pyrimido[5′,4′:4,5]thieno[3,2-d][1,3]oxazin-4-one;
7-(p-iodophenyl)-2-methyl-4H-pyrimido[5′,4′:4,5]thieno[3,2-d][1,3]oxazin-4-one; and
7-(p-fluorophenyl)-2-methyl-4H-pyrimido[5′,4′:4,5]thieno[3,2-d][1,3]oxazin-4-one.

EXAMPLE III 5-amino-2-morpholinothieno[2,3-d]pyrimidine-6-carboxanilide (6.0 g.) in 150 ml. of propionic anhydride is heated under reflux for five hours. Thereafter, the reaction mixture is cooled in ice, filtered and the collected solid recrystallized from dimethylformamide to yield 2- ethyl - 7 - morpholino - 4H-pyrimido[5',4':4,5]thieno-[3,2-d][1,3]oxazin-4-one.

In a similar manner, when 5-amino-2-p-methoxyphenyl) thieno[2,3-d]pyrimidine-6-carboxanilide is reacted with butyric anhydride, there is afforded 7-(p-methoxyphenyl) - 2 - propyl - 4H - pyrimido[5',4':4,5]thieno[3,2-d][1,3]oxazin-4-one.

EXAMPLE IV

5 - amino - 2-methylthieno[2,3-d]pyrimidine-6-carboxanilide (2.0 g.) in 50 ml. of acetic anhydride is heated under reflux for three hours. Thereafter, the reaction mixture is cooled in ice, filtered and the collected solid recrystallized from dimethylformamide to yield 2,7-dimethyl-4H-pyrimido[5',4':4,5]thieno[3,2-d][1,3]oxalin-4-one.

When the above reaction is reaction is repeated to react an appropriate 5-amino-2-substituted thieno[2,3-d]pyrimidine-6-carboxanilides with acetic anhydride the following compounds are produced:

7-ethyl-2-methyl-4H-pyrimido[5',4':4,5]thieno[3,2-d][1,3]oxazin-4-one;
2-methyl-7-(p-propoxyphenyl)-4H-pyrimido[5',4':4,5]thieno[3,2-d][1,3]oxazin-4-one;
7-butyl-2-methyl-4H-pyrimido[5',4':4,5]thieno[3,2-d][1,3]oxazin-4-one;
7-(p-ethylphenyl)-2-methyl-4H-pyrimido[5',4':4,5]thieno[3,2d][1,3]oxazin-4-one; and
7-(m-ethoxyphenyl)-2-methyl-4H-pyrimido[5',4':4,5]thieno[3,2-d][1,3]oxazin-4-one.

What is claimed is:
1. A compound selected from the group consisting of those having the formula:

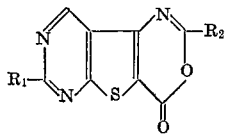

wherein $R_1$ is selected from the group consisting of lower alkyl, morpholino, phenyl, halophenyl, lower alkylphenyl, and lower alkoxyphenyl; and $R_2$ is lower alkyl.

2. A compound as described in claim 1 which is: 2-methyl - 7 - phenyl - 4H-pyrimido[5',4':4,5]thieno[3,2-d][1,3]oxazin-4-one.

3. A compound as described in claim 1 which is: 2-methyl - 7(p-tolyl)-4H-pyrimido[5',4':4,5]thieno[3,2-d][1,3]oxalin-4-one.

4. A compound as described in claim 1 which is: 7-(p-chlorophenyl) - 2 - methyl-4,H-pyrimido[5',4':4,5]thieno[3,2-d][1,3]oxazin-4-one.

5. A process for the preparation of compounds having the formula:

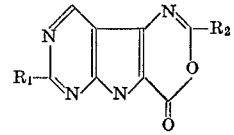

wherein $R_1$ is selected from the group consisting of lower alkyl, morpholino, phenyl, halophenyl, lower alkylphenyl, lower alkoxyphenyl; and $R_2$ is lower alkyl which comprises contacting a compound having the formula:

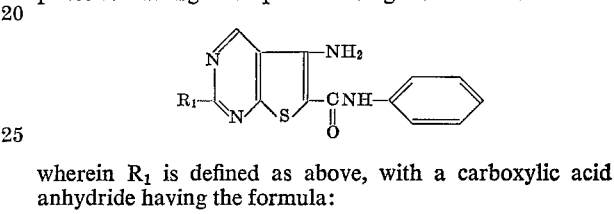

wherein $R_1$ is defined as above, with a carboxylic acid anhydride having the formula:

$$(R_2CO)_2O$$

wherein $R_2$ is defined as above, at about reflux temperatures for a period of about one to about five hours.

References Cited
UNITED STATES PATENTS

| | | | |
|---|---|---|---|
| 2,633,466 | 3/1953 | Walling-Ford | 260—244 R |
| 3,410,850 | 11/1968 | Cragoe et al. | 260—244 R |
| 3,549,627 | 12/1970 | Kim et al. | 260—244 R |

OTHER REFERENCES

Chemical Abstracts Subject Index, A–I, p. 490S, column 1, July-December, 1967 (1968).

McClelland et al., J. Chem. Soc. (London) 1948, pp. 78–81.

Shvedov et al., Chem. Abst. vol. 66, No. 37711w (1967).

NATALIE TROUSOF, Primary Examiner

U.S. Cl. X.R.

260—247.1, 256.5 R; 424—251

UNITED STATES PATENT OFFICE
CERTIFICATE OF CORRECTION

Patent No. 3,644,351        Dated June 1, 1972

Inventor(s) Arthur A. Santilli and Dong H. Kim

It is certified that error appears in the above-identified patent and that said Letters Patent are hereby corrected as shown below:

Column 1, line 61, "mehyl" should be --methyl--.

Column 2, line 15, structural formula (III) should be as shown below:

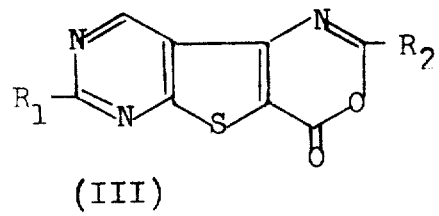

(III)

Column 4, line 31, "circumtances" should be --circumstances--.

Column 5, line 3, "2-p-methoxyphen-" should be -- 2-(p-methoxyphen- --.

Column 5, line 16, "oxalin" should be --oxazin--.

Column 6, claim 3, line 3, "oxalin" should be --oxazin--.

Column 6, claim 5, the structural formula should be as shown below:

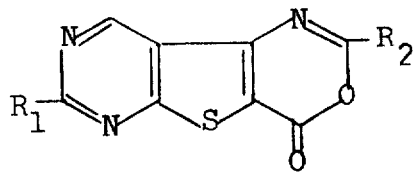

Column 6, claim 4, line 2, the comma before "H" should be deleted.

Signed and sealed this 5th day of September 1972.

(SEAL)
Attest:

EDWARD M, FLETCHER, JR.
Attesting Officer

ROBERT GOTTSCHALK
Commissioner of Patents